(12) United States Patent
Watanabe

(10) Patent No.: US 10,288,169 B2
(45) Date of Patent: May 14, 2019

(54) SHIFT DEVICE

(71) Applicant: KABUSHIKI KAISHA TOKAI-RIKA-DENKI-SEISAKUSHO, Aichi-ken (JP)

(72) Inventor: Hironori Watanabe, Aichi-ken (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 249 days.

(21) Appl. No.: 15/367,698

(22) Filed: Dec. 2, 2016

(65) Prior Publication Data
US 2017/0175883 A1    Jun. 22, 2017

(30) Foreign Application Priority Data

Dec. 21, 2015 (JP) ................. 2015-249005

(51) Int. Cl.
*G05G 1/08* (2006.01)
*G05G 5/06* (2006.01)
(Continued)

(52) U.S. Cl.
CPC ............. *F16H 61/24* (2013.01); *F16H 59/08* (2013.01); *F16H 61/22* (2013.01);
(Continued)

(58) Field of Classification Search
CPC .... F16H 59/08; F16H 59/081; F16H 59/0278; F16H 2059/081; F16H 51/22;
(Continued)

(56) References Cited

U.S. PATENT DOCUMENTS

| | | | |
|---|---|---|---|
| 5,775,165 A | * | 7/1998 | Lu ........................ F16H 61/24 74/473.28 |
| 5,945,647 A | * | 8/1999 | Hoskins ............. H05B 37/0209 200/18 |

(Continued)

FOREIGN PATENT DOCUMENTS

| | | | | |
|---|---|---|---|---|
| JP | 2015-107671 A | | 6/2015 | |
| WO | WO-2014198293 A1 | * | 12/2014 | ............. F16H 61/22 |
| WO | 2017049051 A1 | | 3/2017 | |

OTHER PUBLICATIONS

European Search Report of European Application No. 16202841.9, dated Jun. 28, 2017.

*Primary Examiner* — William Kelleher
*Assistant Examiner* — T. Scott Fix
(74) *Attorney, Agent, or Firm* — Roberts Mlotkowski Safran Cole & Calderon, P.C.

(57) ABSTRACT

A shift device including: a shift body that is rotatable to change a shift position; an installation body, relative to which the shift body rotates; a contact portion that is provided to one of the shift body or the installation body; a contact member that is provided to the other of the shift body or the installation body, and that makes contact with the contact portion such that a force acts to rotate the shift body from between shift positions toward a shift position side; a rotation portion that causes the shift body to rotate such that a shift position of the shift body is changed; and a release mechanism that releases contact of the contact member with the contact portion when the rotation portion causes the shift body to rotate.

3 Claims, 19 Drawing Sheets

(51) Int. Cl.
  *F16H 59/08* (2006.01)
  *F16H 61/22* (2006.01)
  *F16H 61/24* (2006.01)

(52) U.S. Cl.
  CPC .. *F16H 2059/081* (2013.01); *F16H 2061/247* (2013.01); *G05G 1/08* (2013.01); *G05G 5/06* (2013.01)

(58) Field of Classification Search
  CPC ............... F16H 63/38; F16H 2061/241; F16H 2061/243; F16H 2061/245; F16H 2061/247; F16H 61/24; B60K 37/06; H01H 19/16; Y10T 74/2014; Y10T 74/20098; Y10T 74/20128; Y10T 74/1418; Y10T 74/1424; G05G 5/02–04; G05G 5/06; G05G 5/065; G05G 5/08
  USPC .............. 74/473.21, 473.23, 473.24, 473.25, 74/473.26, 473.28
  See application file for complete search history.

(56) References Cited

U.S. PATENT DOCUMENTS

| | | | |
|---|---|---|---|
| 6,324,928 B1* | 12/2001 | Hughes | F16H 63/34 477/124 |
| 2004/0244524 A1* | 12/2004 | Russell | F16H 59/10 74/473.23 |
| 2008/0141816 A1* | 6/2008 | O'Brien | F16H 61/24 74/493 |
| 2013/0061706 A1* | 3/2013 | Wang | F16H 59/10 74/473.15 |
| 2015/0152958 A1* | 6/2015 | Watanabe | F16H 59/08 74/473.12 |
| 2015/0159747 A1* | 6/2015 | Hoskins | F16H 59/0217 74/473.23 |
| 2015/0167827 A1* | 6/2015 | Fett | F16H 59/08 74/473.3 |
| 2015/0285351 A1* | 10/2015 | Rake | G05G 1/08 74/436 |
| 2016/0245403 A1 | 8/2016 | Rake et al. | |

* cited by examiner

SHIFT DEVICE

CROSS-REFERENCE TO RELATED APPLICATION

This application is based on and claims priority under 35 USC 119 from Japanese Patent Application No. 2015-249005 filed on Dec. 21, 2015, the disclosure of which is incorporated by reference herein.

BACKGROUND

Technical Field

The present disclosure relates to a shift device in which a shift body is rotated to change a shift position of the shift body.

Related Art

Japanese Patent Application Laid-Open (JP-A) No. 2015-107671 describes a shift device in which plural recesses are provided to a guide face of an indexing member, and a pin makes contact with the guide face of the indexing member due to resilient force, such that a force acts to rotate the indexing member from between shift positions toward a shift position side. A motor is driven to cause a cam member to rotate, such that the cam member rotates the indexing member, and the shift position of the indexing member is changed to a parking position.

When the cam member causes the indexing member to rotate in such a shift device, it is preferable to be able to suppress abnormal noise arising from the pin riding over protrusions between the recesses of the guide face of the indexing member (ride-over noise).

SUMMARY

In consideration of the above circumstances, the present disclosure provides a shift device capable of suppressing abnormal noise from arising when a rotation portion causes a shift body to rotate.

A shift device of a first aspect of the present disclosure includes a shift body that is rotatable to change a shift position, an installation body, relative to which the shift body rotates, a contact portion that is provided to one of the shift body or the installation body, a contact member that is provided to the other of the shift body or the installation body, and that makes contact with the contact portion such that a force acts to rotate the shift body from between shift positions toward a shift position side, a rotation portion that causes the shift body to rotate such that a shift position of the shift body is changed, and a release mechanism that releases contact of the contact member with the contact portion when the rotation portion causes the shift body to rotate.

A shift device of a second aspect of the present disclosure is the shift device of the first aspect, further including a rotation member that is provided at the rotation portion and that causes the shift body to rotate, and a release portion that is provided at the release mechanism, that is moved when the rotation member rotates the shift body, and that releases contact of the contact member with the contact portion.

A shift device of a third aspect of the present disclosure is the shift device of the second aspect, wherein the release portion is provided at the rotation member.

A shift device of a fourth aspect of the present disclosure is the shift device of the second aspect, wherein the release portion is provided separately from the rotation member.

A shift device of a fifth aspect of the present disclosure is the shift device of any one of the second aspect to the fourth aspect, further including an inclined face that is provided at at least one of an abutting portion of the release portion with the contact member, or an abutting portion of the contact member with the release portion, and that is inclined in a direction toward the contact portion side on progression along the direction of movement of the release portion.

A shift device of a sixth aspect of the present disclosure is the shift device of any one of the first aspect to the fifth aspect, wherein the contact member includes plural contact members configured so as to be capable of moving integrally with each other.

In the shift device of the first aspect of the present disclosure, the shift body is rotated with respect to the installation body to change the shift position of the shift body. The contact portion is provided to one out of the shift body or the installation body, the contact member is provided to the other out of the shift body or the installation body, and the contact member makes contact with the contact portion such that a force acts to rotate the shift body from between shift positions toward a shift position side.

The rotation portion causes the shift body to rotate such that the shift position of the shift body is changed.

The release mechanism releases contact of the contact member with the contact portion when the rotation portion causes the shift body to rotate. Abnormal noise can thereby be suppressed from arising.

In the shift device of the second aspect of the present disclosure, the rotation member of the rotation portion causes the shift body to rotate.

Note that the release portion of the release mechanism is moved when the rotation member rotates the shift body, and releases contact of the contact member with the contact portion. Contact of the contact member with the contact portion can thus be released using a simple configuration.

In the shift device of the third aspect of the present disclosure, the release portion is provided to the rotation member. The release portion can thus be easily installed.

In the shift device of the fourth aspect of the present disclosure, the release portion is provided separately from the rotation member. The release portion can thus be suppressed from interfering with other components.

In the shift device of the fifth aspect of the present disclosure, the inclined face is provided to at least one out of an abutting portion of the release portion with the contact member, or an abutting portion of the contact member with the release portion, and the inclined face is inclined in a direction toward the contact portion side on progression along the direction of movement of the release portion. Accordingly, due to the release portion being moved, the contact member can be easily moved by the inclined face to the opposite side to the contact portion, and contact of the contact member with the contact portion can be easily released.

In the shift device of the sixth aspect of the present disclosure, plural contact members are configured so as to be capable of moving integrally with each other. The release portion thereby causes the plural contact members to move integrally with each other, such that the contact of the plural contact members with the contact portion can be easily released.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
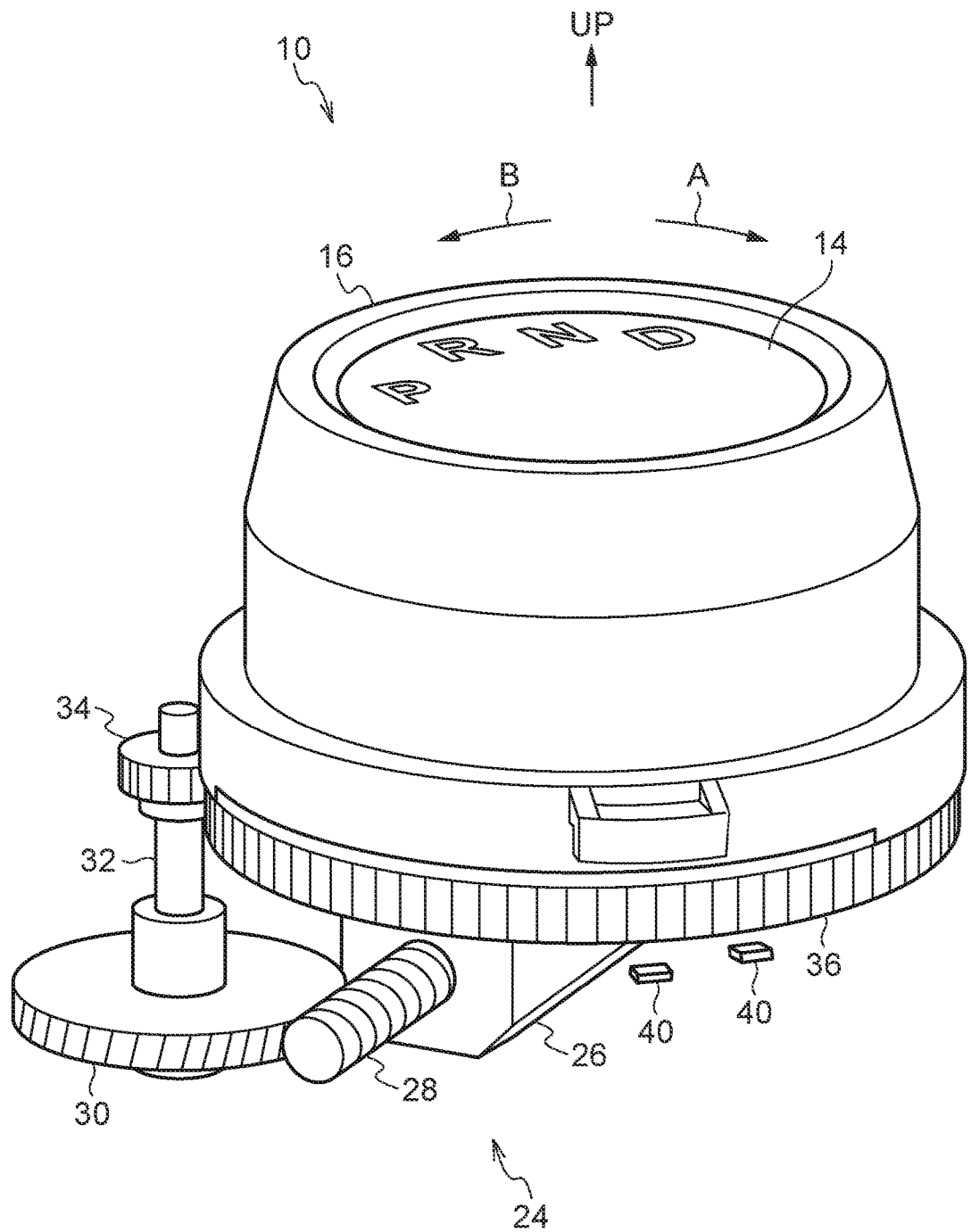
FIG. 1 is a perspective view illustrating a shift device according to a first exemplary embodiment of the present disclosure, as viewed from above.
Figure 2:
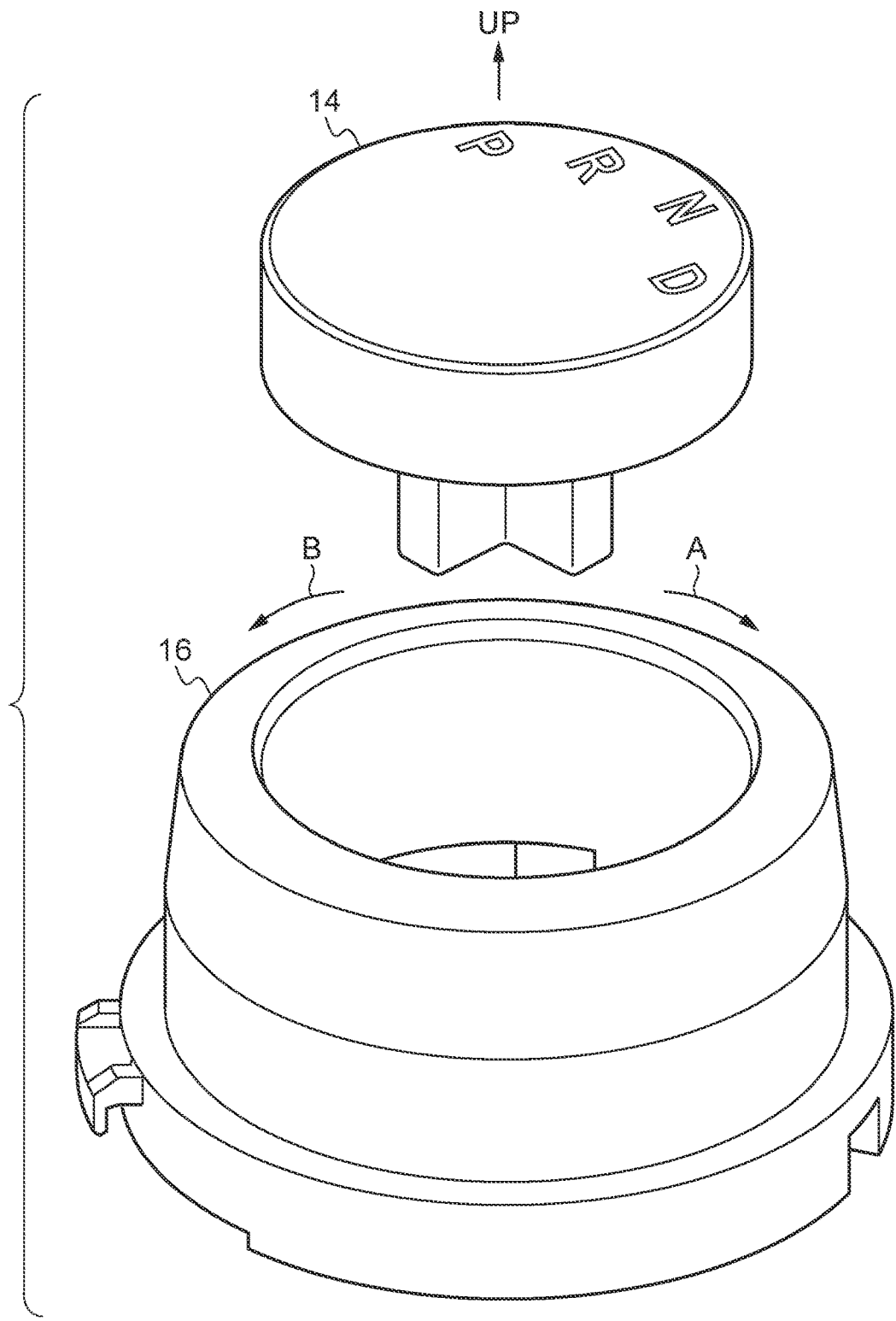
FIG. 2 is an exploded perspective view illustrating an upper portion of the shift device according to the first exemplary embodiment of the present disclosure, as viewed from above.
Figure 3:
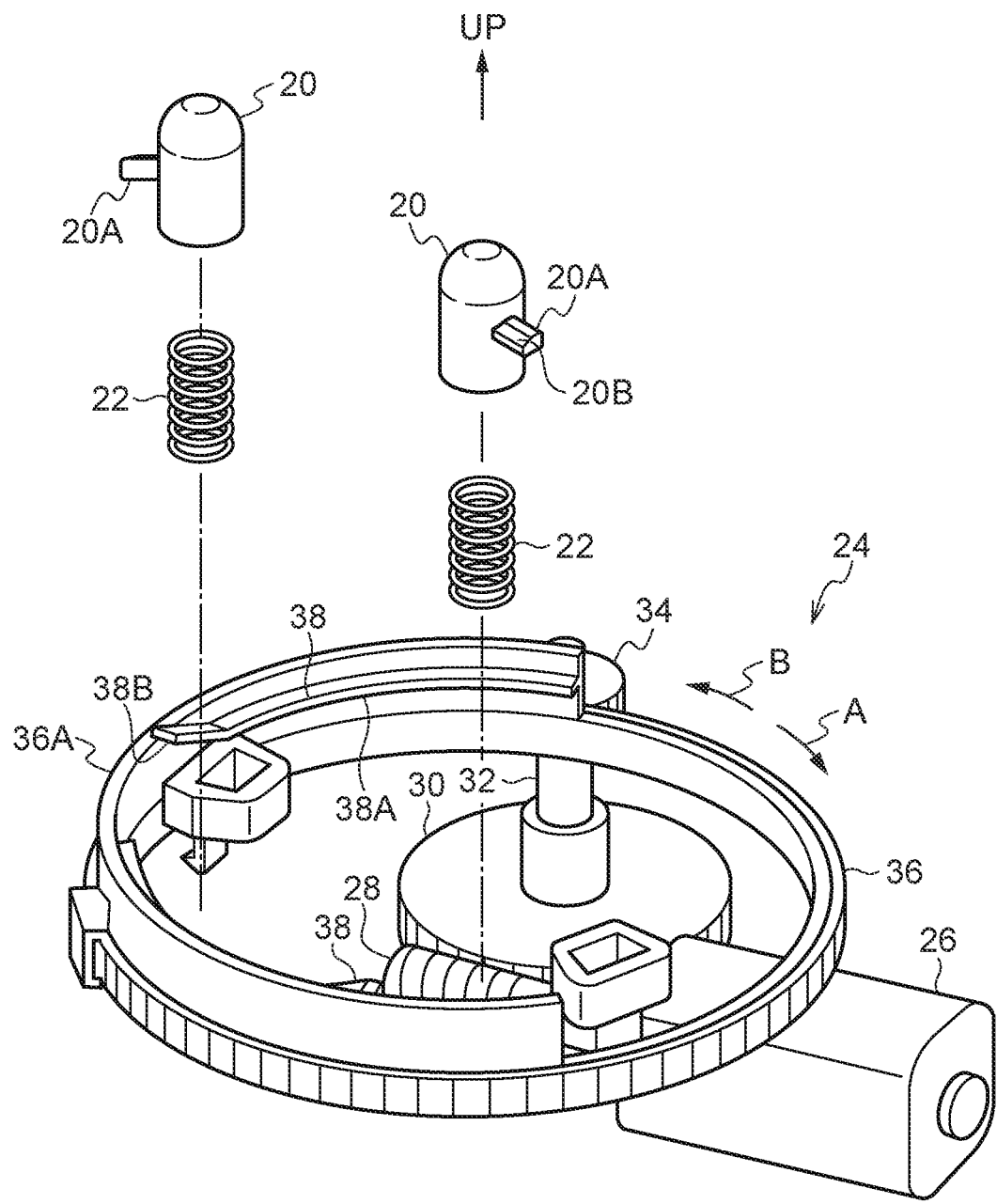
FIG. 3 is an exploded perspective view illustrating a lower portion of a shift device according to the first exemplary embodiment of the present disclosure, as viewed from above.

FIG. 1 is a perspective view illustrating a shift device 10 according to a first exemplary embodiment of the present disclosure, as viewed from above. FIG. 2 is an exploded perspective view illustrating an upper portion of the shift device 10, as viewed from above, and FIG. 3 is an exploded perspective view illustrating a lower portion of the shift device 10, as viewed from above.

Note that in the drawings, the arrow UP indicates upward in the up-down direction of the shift device 10.

The shift device 10 according to the present exemplary embodiment is what is referred to as a shift-by-wire type of shift device. The shift device 10 is installed to an instrument panel of a vehicle (automobile), and is disposed at the vehicle front side and vehicle width direction inside of a driving seat (not illustrated in the drawings) in the vehicle. Upward for the shift device 10 is oriented diagonally upward and toward the rear of the vehicle.

A substantially rectangular box shaped base 12 (see FIG. 9), serving as a fixing member configuring an installation body, is provided to the shift device 10. The base 12 is fixed to the inside (a vehicle body side) of the instrument panel.

As illustrated in FIG. 1 and FIG. 2, a substantially circular column shaped support base 14, serving as a support member configuring the installation body, is provided to the shift device 10, and a lower side portion of the support base 14 is fixed to the base 12. An axial direction of the support base 14 is disposed parallel to the up-down direction, and the support base 14 projects out from the instrument panel to inside the vehicle cabin.

A substantially circular tube shaped knob 16, serving as a shift body, is coaxially supported at an outer circumference of the support base 14 so as to be capable of rotating. The knob 16 projects out from the instrument panel to inside the vehicle cabin, and is capable of being rotation-operated by an occupant of the vehicle (particularly a driver seated in the driving seat). The knob 16 is capable of rotating over a specific range in one direction ("first direction", the arrow A direction in FIG. 1, etc.) and another direction ("second direction", the arrow B direction in FIG. 1, etc.), so as to enable a shift position thereof to be changed. The knob 16 is capable of being disposed in a P position (parking position), an R position (reverse position), an N position (neutral position), or a D position (drive position) on progression from the other direction side toward the one direction side, with each of these positions serving as a specific shift position.

Plural (two in the present exemplary embodiment) indexing faces 18 (see FIG. 4), serving as contact portions configuring an indexing mechanism, are formed at an inner circumferential side portion in the vicinity of a lower end of the knob 16. The plural indexing faces 18 each extend along the circumferential direction of the knob 16 in a downward-facing state and are separated from each other about the circumferential direction of the knob 16. Plural (four in the present exemplary embodiment) recesses 18A are formed to each indexing face 18. The plural recesses 18A are arrayed side-by-side at equal intervals along the circumferential direction of the knob 16, and are each curved along the circumferential direction of the knob 16. Protrusions 18B are formed to the indexing faces 18 between the recesses 18A, and the protrusions 18B project out toward the lower side.

Engagement projections (not illustrated in the drawings), serving as engagement portions, are provided to an inner circumferential side portion at the vicinity of the lower end of the knob 16. The respective engagement projections project out toward the lower side at the outer peripheral side of the indexing face 18, at different circumferential direction positions of the knob 16 to the positions of the indexing faces 18.

Figure 4:
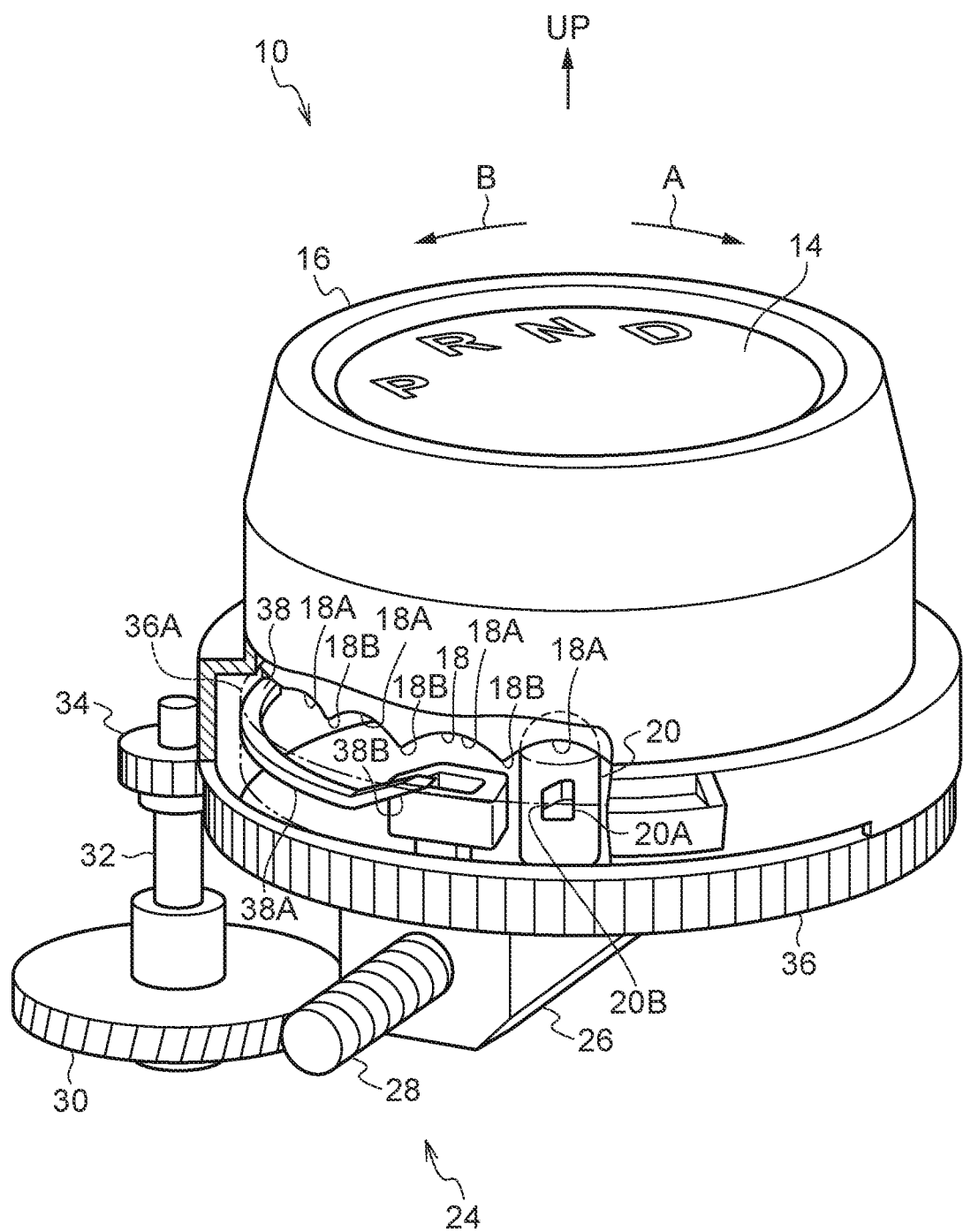
FIG. 4 is a perspective view illustrating a shift device according to the first exemplary embodiment of the present disclosure when a knob is disposed at a D position, as viewed from above.

As illustrated in FIG. 3 and FIG. 4, substantially circular column shaped indexing pins 20, serving as contact members configuring the indexing mechanism, are supported by the base 12 below each indexing face 18, and an axial direction of each indexing pin 20 is disposed parallel to the up-down direction. The indexing pins 20 are restricted from moving in a radial direction and from rotating in the circumferential direction, but are capable of moving in the up-down direction. An upper face of each indexing pin 20 is curved in a convex shape.

A column shaped movable projection 20A, serving as a moveable portion configuring a release mechanism, is integrally provided to a circumferential face of each indexing pin 20, and each movable projection 20A projects out from the indexing pin 20 toward a radial direction outside of the knob 16. A movable inclined face 20B, serving as an inclined face, is formed to a portion at an upper side of and on the one direction side of the movable projection 20A. The movable inclined face 20B is inclined in a direction toward the lower side on progression toward the one direction side.

Springs 22 (compression coil springs), serving as biasing portions configuring the indexing mechanism, span between the base 12 and the respective indexing pin 20. Each spring 22 biases the respective indexing pin 20 upward and causes the upper face of the indexing pin 20 to contact an indexing face 18 of the knob 16. Thus, due to the springs 22 biasing the knob 16, through the indexing pins 20, in a direction from the protrusion 18B side toward the recess 18A side of the indexing faces 18, the knob 16 is biased by the biasing force from the springs 22 in a direction from between shift positions toward a shift position so as to be maintained in the respective shift position. Each time the shift position of the knob 16 is changed when the knob 16 is rotation-operated, the indexing pins 20 are moved between the recesses 18A while riding over the protrusions 18B in a state biased by the springs 22 toward the indexing face 18 side, such that an indexing sensation is imparted when rotation-operating the knob 16.

A shift sensor (not illustrated in the drawings), serving as a shift detection portion, is provided to the base 12 (or to the support base 14 or the knob 16). The shift sensor detects the rotation position of the knob 16 and detects the shift position of the knob 16. The shift sensor is electrically connected to a controller (not illustrated in the drawings) of the vehicle, and an automatic transmission (not illustrated in the drawings) of the vehicle is electrically connected to the controller, such that by changing the shift position of the knob 16, the automatic transmission is changed under control of the controller to the shift range (a P range (parking range), an R range (reverse range), an N range (neutral range), or a D range (drive range)) corresponding to the shift position of the knob 16.

An engine start/stop switch (not illustrated in the drawings), serving as an operation portion, is electrically connected to the controller, and an engine (not illustrated in the drawings) of the vehicle is electrically connected to the controller. The engine is started when the engine start-stop switch is operated by the occupant while the engine is in a stopped state. The engine is stopped when the engine start-stop switch has been operated by the occupant in a state in which the engine is being driven.

An autocorrect mechanism 24, serving as a rotation portion, is provided to the base 12.

A motor 26, serving as a drive portion, is provided to the autocorrect mechanism 24. The motor 26 is fixed to the base 12 below the knob 16, and is electrically connected to the controller. A worm gear 28 is coaxially fixed to an output shaft of the motor 26 so as to be capable of rotating integrally therewith, and the axial direction of the worm gear 28 is disposed perpendicular to the up-down direction.

A helical gear 30 meshes with the worm gear 28. The helical gear 30 is coaxially fixed to a lower end portion of a shaft 32 so as to be capable of rotating integrally therewith. The shaft 32 is supported by the base 12 so as to be capable of rotating, with its axial direction disposed parallel to the up-down direction. A gear 34 is coaxially fixed to an upper end portion of the shaft 32 so as to be capable of rotating integrally therewith. The helical gear 30, the shaft 32, and the gear 34 are thereby integrally rotated by driving the motor 26 to rotate the worm gear 28.

A substantially circular tube shaped rotor cam 36, serving as a rotation member, is supported by the base 12 below the knob 16 so as to be capable of rotating, and the rotor cam 36 is disposed coaxially to the knob 16 at a rotation restriction position. The gear 34 is meshed with outer peripheral teeth of the rotor cam 36 such that the rotor cam 36 is rotated by the gear 34 being rotated.

A curved rectangular plate shaped rotation plate 36A, serving as a rotation portion, is integrally provided to the rotor cam 36. The rotation plate 36A projects out upward and is curved around a circumferential wall of the rotor cam 36. The rotation plate 36A is disposed inside the knob 16, and the rotation plate 36A is separated from the engagement projections of the knob 16 on the one direction side and the other direction side thereof even when the knob 16 is rotated between the P position and the D position, such that the engagement projections of the knob 16 are rendered unable to abut the rotation plate 36A.

Plural (two in the present exemplary embodiment) elongated column shaped release projections 38 (release rails) serving as release portions configuring a release mechanism, are integrally provided to an inner circumferential face of the rotation plate 36A, and the release projections 38 project out from the rotation plate 36A toward the radial direction inside of the rotor cam 36. The plural release projections 38 are separated from each other in the circumferential direction of the rotor cam 36, and the release projections 38 are separated from the respective movable projections 20A of the indexing pins 20 so as to be on the respective one direction side thereof. A portion of each release projection 38, excluding an other direction side end portion thereof, extends along the circumferential direction of the rotor cam 36, and a lower face of each release projection 38 excluding the other direction side end portion is configured by a release maintaining face 38A that extends along the circumferential direction of the rotor cam 36. The other direction side end portion of the release projection 38 is inclined in a downward direction on progression toward the one direction side, and a lower face of the other direction side end portion of each release projection 38 is configured by a release inclined face 38B, serving as an inclined face that is inclined in a downward direction on progression toward the one direction side.

As illustrated in FIG. 1, rotation sensors 40 (for example, Hall effect ICs), serving as a rotation detection portion, are provided to the base 12 (or to the support base 14 or the knob 16). The rotation sensors 40 detect the rotation position of the rotor cam 36, and are electrically connected to the controller.

Next, explanation follows regarding operation of the present exemplary embodiment.

In the shift device 10 configured as described above, the knob 16 is rotation-operated to change the shift position of the knob 16 between the P position, the R position, the N position, and the D position. Each time the shift position of the knob 16 is changed when the knob 16 is rotation-operated, the indexing pins 20 are moved between the recesses 18A while riding over the protrusions 18B of the indexing faces 18 in a state contacting the indexing faces 18 of the knob 16 due to biasing force from the springs 22, such that an indexing sensation is imparted when rotation-operating the knob 16.

By the way, as illustrated in FIG. 4, when the engine start/stop switch is operated while the engine is in a stopped state in cases in which the knob 16 is disposed at a shift position other than the P position (i.e. the R position, the N position, or the D position; the D position in FIG. 4) (in cases in which the shift sensor has detected that the shift position of the knob 16 is not the P position), the shift range of the automatic transmission is changed to the P range under control of the controller. Moreover, the changed state of the shift range of the automatic transmission to the P range is maintained until, after the engine start/stop switch has next been operated and the engine started, the knob 16 is rotated to a position other than the P position (until the shift sensor has detected that the shift position of the knob 16 has been changed to a shift position other than the P position). The shift range of the automatic transmission is accordingly always in the P shift range whenever the engine start/stop switch is operated.

When an attempt is made to operate the engine start/stop switch in cases in which the knob 16 has been disposed in a position other than the P position (at a specific occasion: when at least one out of stopping or starting the engine has been performed), the worm gear 28, the helical gear 30, the shaft 32, and the gear 34 are rotated so as to rotate the rotor cam 36 in the other direction by reverse-driving the motor 26 in the autocorrect mechanism 24 under control of the controller. The rotation plate 36A of the rotor cam 36 thereby abuts the engagement projections of the knob 16, and then presses the engagement projections of the knob 16 toward the other direction side such that the knob 16 is rotated in the other direction, and the knob 16 is rotated to the P position. Thus, whenever the engine start/stop switch is operated, the knob 16 can be disposed (returned) to the P position, and the shift position of the knob 16 and the shift range of the automatic transmission can be made to match each other.

When the knob 16 has been rotated to the P position (when the shift sensor has detected that the shift position of the knob 16 is in the P position), the motor 26 is forward-driven under control of the controller such that the worm gear 28, helical gear 30, shaft 32, and gear 34 are rotated, and the rotor cam 36 is rotated in the one direction. Moreover, when the rotor cam 36 has been rotated to the rotation restriction position (when the rotation sensors 40 have detected that the rotation position of the rotor cam 36 is the rotation restriction position), forward-driving of the motor 26 is stopped under control of the controller, and thus rotation of the rotor cam 36 in the one direction is stopped. The rotation plate 36A of the rotor cam 36 is accordingly separated from the engagement projections of the knob 16 toward the one direction side, and the engagement projections of the knob 16 are rendered unable to abut the rotation plate 36A of the rotor cam 36, even if the knob 16 is rotated from the P position to the D position.

Moreover, when the rotor cam 36 is rotated in the other direction as described above, the release projections 38 of the rotor cam 36 (rotation plate 36A) are rotated in the other direction.

Figure 5:
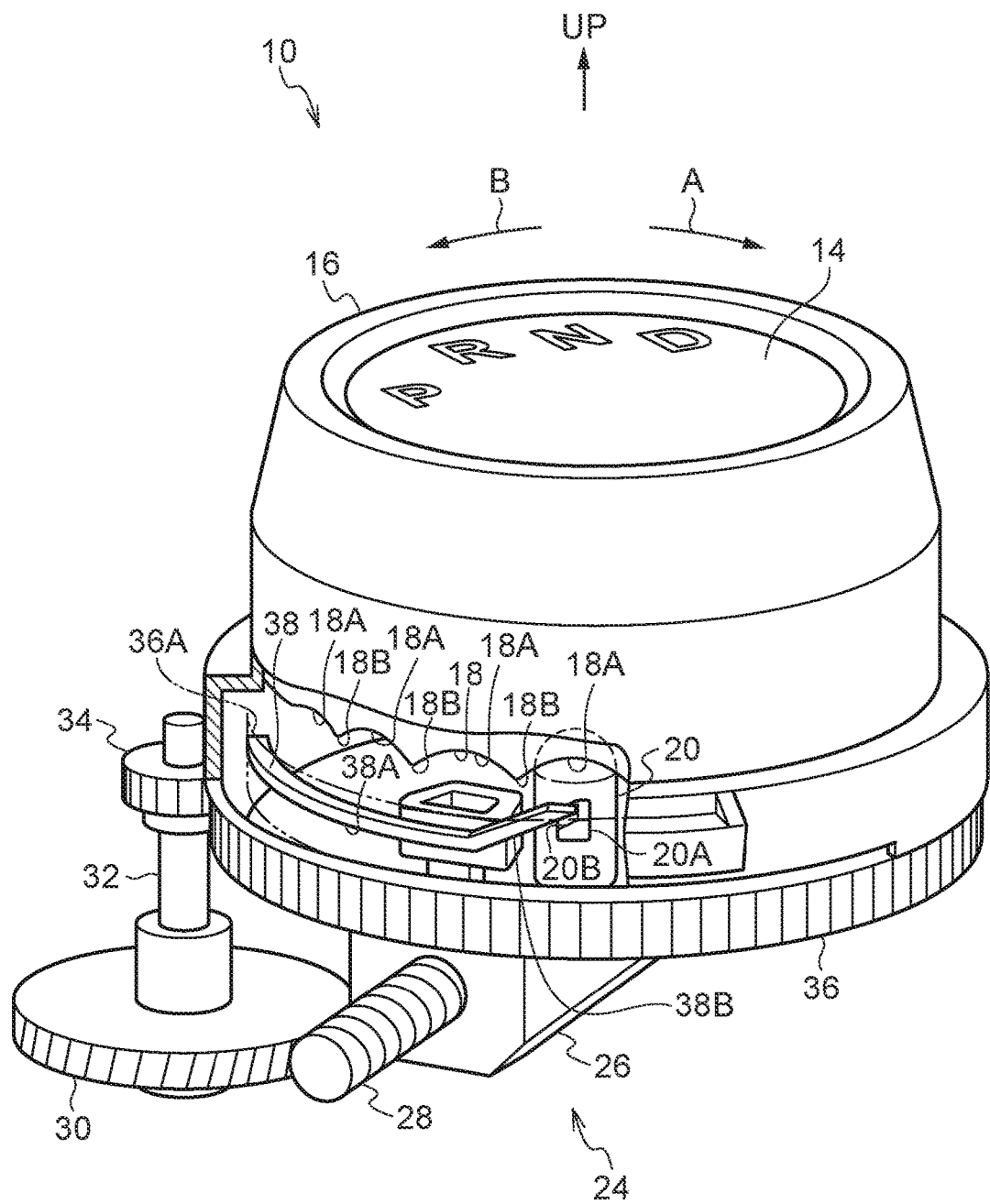
FIG. 5 is a perspective view illustrating a shift device according to the first exemplary embodiment of the present disclosure when a rotor cam begins to rotate, as viewed from above.
Figure 6:
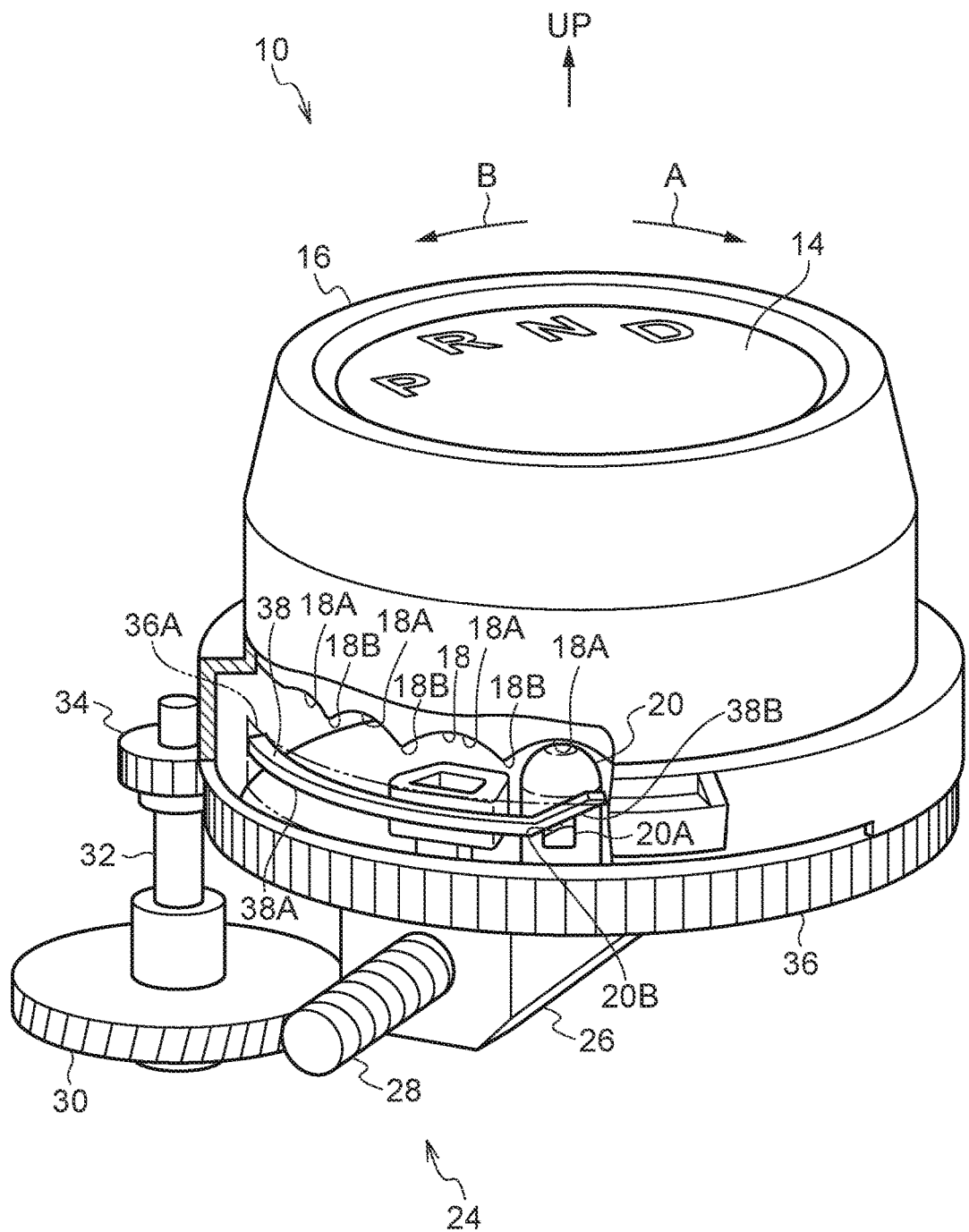
FIG. 6 is a perspective view illustrating a shift device according to the first exemplary embodiment of the present disclosure when an indexing pin begins to move, as viewed from above.
Figure 7:
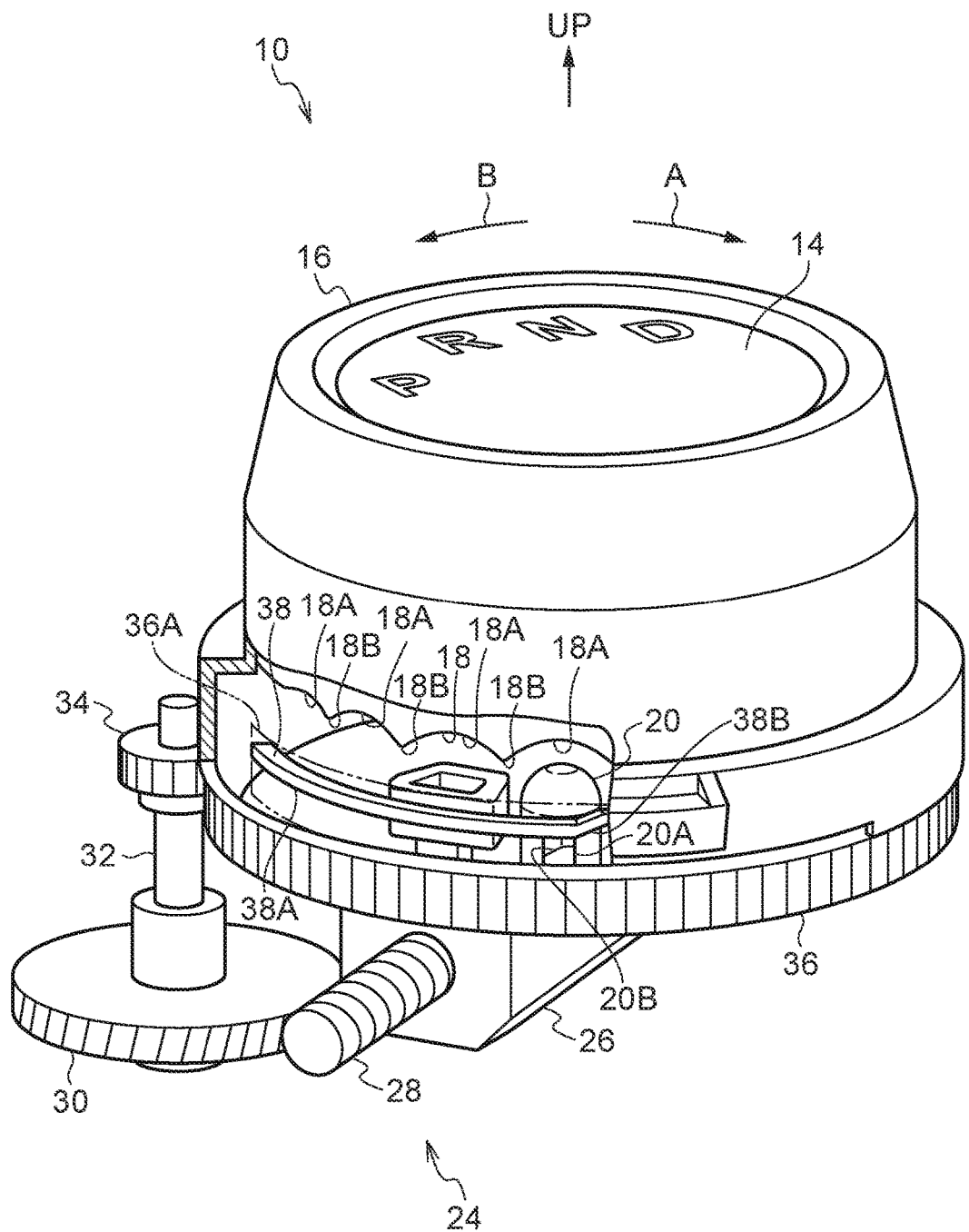
FIG. 7 is a perspective view illustrating a shift device according to the first exemplary embodiment of the present disclosure when an indexing pin has been moved, as viewed from above.

Accordingly, prior to the rotation plate 36A of the rotor cam 36 pressing the engagement projections of the knob 16 toward the other direction side, as illustrated in FIG. 5, the release inclined face 38B of each release projection 38 abuts the movable inclined face 20B of the movable projection 20A of the respective indexing pin 20. As illustrated in FIG. 6, the release inclined face 38B presses the respective movable inclined face 20B downward, and the indexing pin 20 is moved downward against the biasing force of the respective spring 22 such that, as illustrated in FIG. 7, the movable projection 20A reaches the lower side of the release maintaining face 38A of the release projection 38, and the indexing pin 20 is separated from, and rendered uncontactable with, the respective indexing face 18 of the knob 16 (contact of the indexing pin 20 with the indexing face 18 is released).

Figure 8:
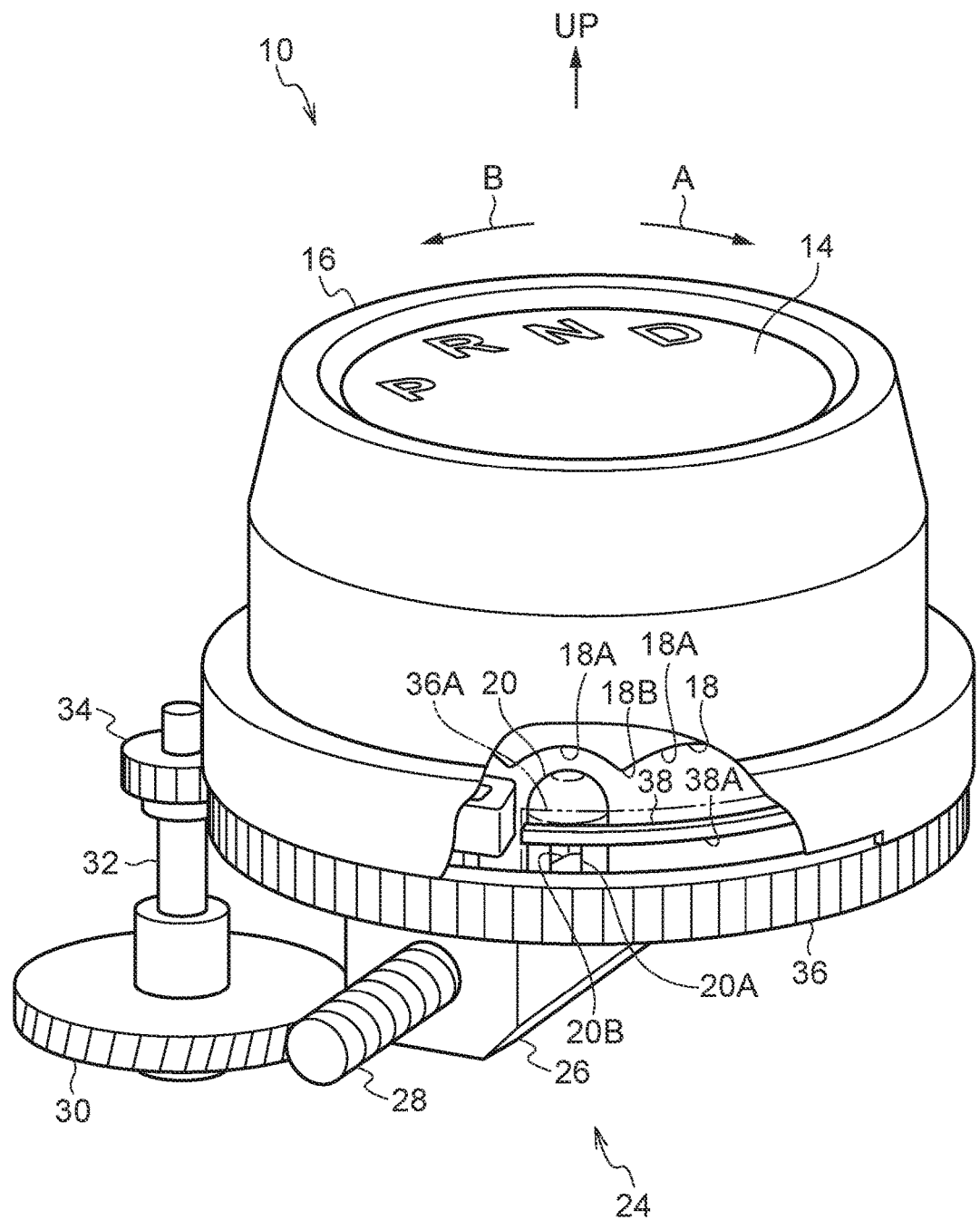
FIG. 8 is a perspective view illustrating a shift device according to the first exemplary embodiment of the present disclosure when a knob has been rotated to a P position, as viewed from above.

Then, when the rotation plate 36A of the rotor cam 36 presses the engagement projection of the knob 16 toward the other direction side and the knob 16 is rotated from a shift position that is not the P position to the P position, as illustrated in FIG. 8, due to the release maintaining face 38A of each release projection 38 being moved over and remaining above the respective movable projection 20A, a state is maintained in which the movable projection 20A is pressed downward by the release maintaining face 38A, and a state is maintained in which each indexing pin 20 is separated from, and rendered uncontactable with, the respective indexing face 18 of the knob 16.

When the rotor cam 36 is then rotated in the one direction, the release maintaining face 38A and the release inclined face 38B of each release projection 38 are passed back over the respective movable projection 20A. Thus, prior to the rotor cam 36 being rotated to the rotation restriction position, the downward pressing of each movable projection 20A by the respective release projection 38 is released such that each indexing pin 20 makes contact with the respective indexing face 18 of the knob 16 due to biasing force from the respective spring 22.

As described above, when the knob 16 is rotated by the rotor cam 36 from a shift position other than the P position to the P position, each release projection 38 of the rotor cam 36 moves the movable projection 20A of the respective indexing pin 20 downward, and the indexing pin 20 is separated from, and is rendered uncontactable with, the respective indexing face 18 of the knob 16. Thus, generation of abnormal noise, from each indexing pin 20 riding over the protrusions 18B between the recesses 18A of the respective indexing face 18 (ride-over noise) in a state in which the indexing pin 20 contacts the indexing face 18 due to biasing force from the respective spring 22, can be suppressed.

As described above, due to each of the release projections 38 being rotated when the rotor cam 36 rotates the knob 16 from a shift position other than the P position to the P position, each release projection 38 causes the respective indexing pin 20 to separate from, and become rendered uncontactable with, the respective indexing face 18 of the knob 16. Each indexing pin 20 can therefore be caused to separate from, and be rendered uncontactable with, the respective indexing face 18 using a simple configuration.

The release projections 38 are provided to the rotor cam 36. The release projections 38 can thus be easily rotated by rotating the rotor cam 36, and the release projections 38 can be easily installed.

Moreover, each release inclined face 38B of the rotor cam 36 (each release projection 38) and the movable inclined face 20B of the respective indexing pin 20 (the movable projection 20A) are inclined in a downward direction on progression toward the one direction side. Thus, by rotating the rotor cam 36 in the other direction, each release inclined face 38B can easily move the respective movable inclined face 20B downward and can easily separate the indexing pin 20 from the respective indexing face 18 of the knob 16.

Each indexing pin 20 makes contact with the respective indexing face 18 of the knob 16 in the axial direction of the knob 16. The shift device 10 can thus be made more compact in the radial direction of the knob 16.

Second Exemplary Embodiment

Figure 9:
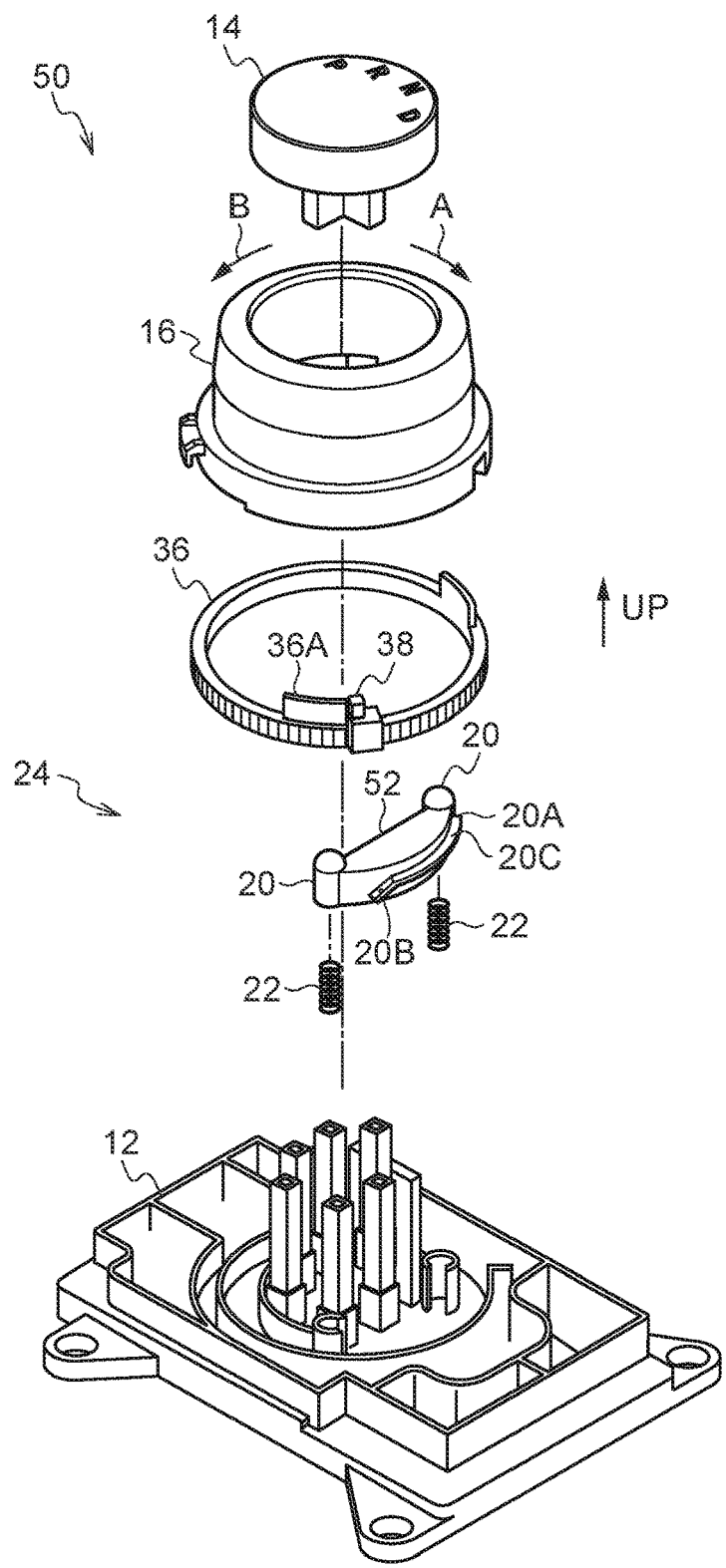
FIG. 9 is an exploded perspective view illustrating a shift device according to a second exemplary embodiment of the present disclosure, as viewed from above.
Figure 10:
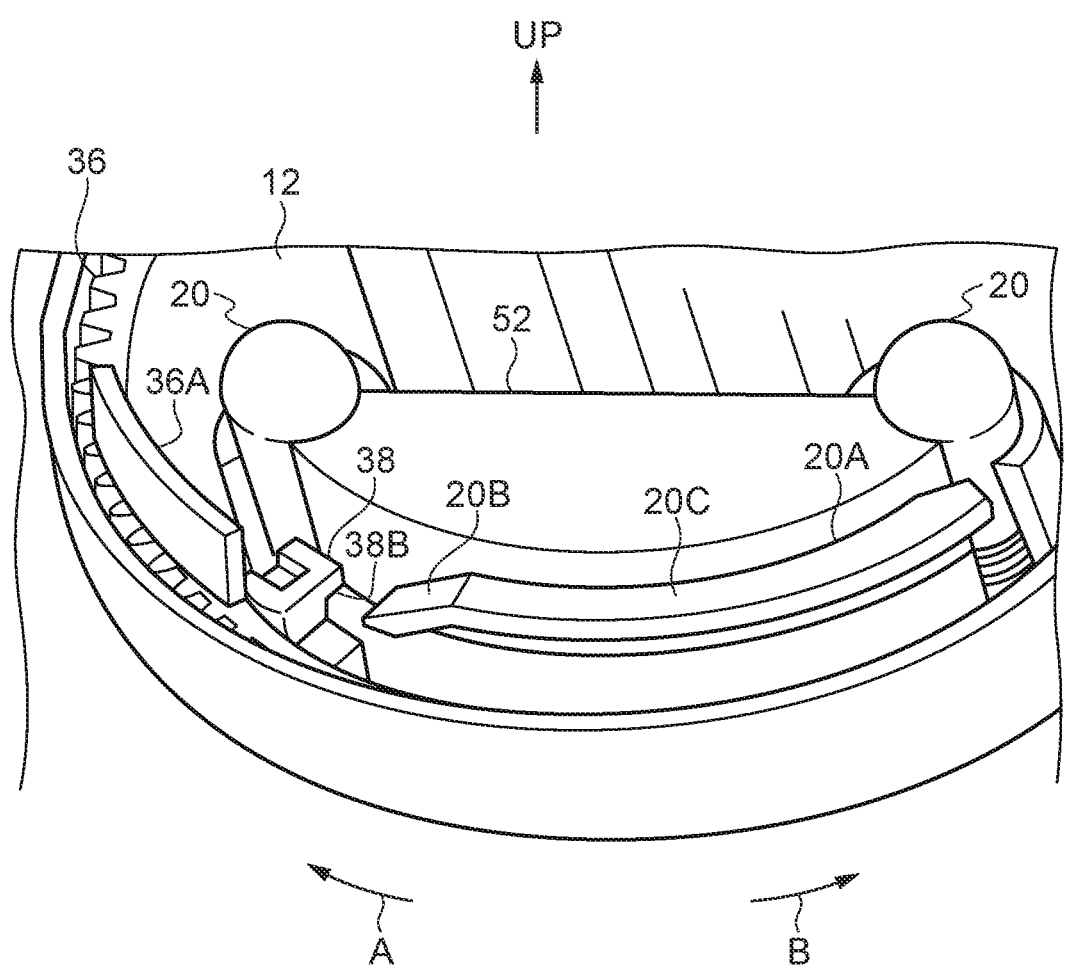
FIG. 10 is a perspective view illustrating relevant portions of a shift device according to the second exemplary embodiment of the present disclosure, as viewed from above.

FIG. 9 is an exploded perspective view illustrating a shift device 50 according to a second exemplary embodiment of the present disclosure, as viewed from above, and FIG. 10 is a perspective view illustrating relevant portions of the shift device 50, as viewed from above.

The shift device 50 according to the present exemplary embodiment has basically similar configuration to that of the first exemplary embodiment described above, except with regard to the following points.

As illustrated in FIG. 9 and FIG. 10, in the shift device 50 according to the present exemplary embodiment, plural (two in the present exemplary embodiment) indexing pins 20 are coupled together by a column shaped coupling portion 52, and an outside face of the coupling portion 52 on the radial direction outside of the rotor cam 36 is curved along the circumferential direction of the rotor cam 36. An elongated column shaped movable projection 20A (movement rail) is integrally formed to the outside face of the coupling portion 52, and the movable projection 20A projects out from the coupling portion 52 toward the radial direction outside of the rotor cam 36. A portion of the movable projection 20A, excluding a one direction side end portion thereof, extends along the circumferential direction of the rotor cam 36. An upper face of the movable projection 20A excluding the one direction side end portion is configured by a movement maintaining face 20C that extends along the circumferential direction of the rotor cam 36. The one direction side end portion of the movable projection 20A is inclined in an upward direction on progression toward the other direction side. An upper face of the one direction side end portion of the movable projection 20A is configured by a movable inclined face 20B, and is inclined in an upward direction on progression toward the other direction side.

A column shaped release projection 38 is integrally formed to the rotor cam 36 in the vicinity of the other direction side of the rotation plate 36A, and the release projection 38 projects out toward the radial direction inside of the rotor cam 36. A portion at the lower side and the other direction side of the release projection 38 is configured by a release inclined face 38B, and the release inclined face 38B is inclined in an upward direction on progression toward the other direction side.

In the autocorrect mechanism 24, when the rotor cam 36 is rotated in the other direction, the release projection 38 of the rotor cam 36 is rotated in the other direction.

Thus, prior to the rotation plate 36A of the rotor cam 36 pressing the engagement projection of the knob 16 toward the other direction side, the release inclined face 38B of the release projection 38 abuts the movable inclined face 20B of the movable projection 20A of the indexing pins 20 (coupling portion 52). The release inclined faces 38B press the respective movable inclined faces 20B downward, and the indexing pins 20 (including the coupling portion 52) are moved downward against the biasing force from the springs 22, such that a state is reached in which the release projection 38 is above the movement maintaining face 20C of the movable projection 20A, and each indexing pin 20 is separated from, and rendered uncontactable with, the respective indexing face 18 of the knob 16 (contact of the indexing pins 20 with the respective indexing face 18 is released).

Then, when the rotation plate 36A of the rotor cam 36 presses the engagement projection of the knob 16 toward the other direction side and the knob 16 is rotated from a shift position other than the P position to the P position, due to the release projection 38 being moved over and remaining above the movement maintaining face 20C of the movable projection 20A, a state is maintained in which the movement maintaining face 20C is pressed downward by the release projection 38, and a state is maintained in which each indexing pin 20 is separated from, and rendered uncontactable with, the respective indexing face 18 of the knob 16.

When the rotor cam 36 is then rotated in the one direction, the release projection 38 passes back over the movement maintaining face 20C and the movable inclined face 20B of the movable projection 20A. Thus, prior to the rotor cam 36 being rotated to the rotation restriction position, the downward pressing of the movable projection 20A by the release projection 38 is released such that each indexing pin 20 makes contact with the respective indexing face 18 of the knob 16 due to biasing force from the respective spring 22.

The present exemplary embodiment accordingly enables similar operation and advantageous effects to be exhibited as those of the first exemplary embodiment above.

The plural indexing pins 20 are coupled together by the coupling portion 52, such that the plural indexing pins 20 are capable of moving integrally with each other. Accordingly, the plural indexing pins 20 can be moved integrally with each other, enabling the indexing pins 20 to be separated from the indexing faces 18 of the knob 16, and enabling the plural indexing pins 20 to be easily separated from the indexing faces 18 of the knob 16. Moreover, even if the number of release projections 38 (one in the present exemplary embodiment) is less than the number of indexing pins 20, the plural indexing pins 20 can still be separated from the indexing faces 18 of the knob 16. Thus, the installation range of the release projection 38 and the movable projection 20A along the circumferential direction of the rotor cam 36 can be made smaller, and the necessary space to cause the plural indexing pins 20 to separate from the indexing faces 18 of the knob 16 can be reduced.

Third Exemplary Embodiment

Figure 11:
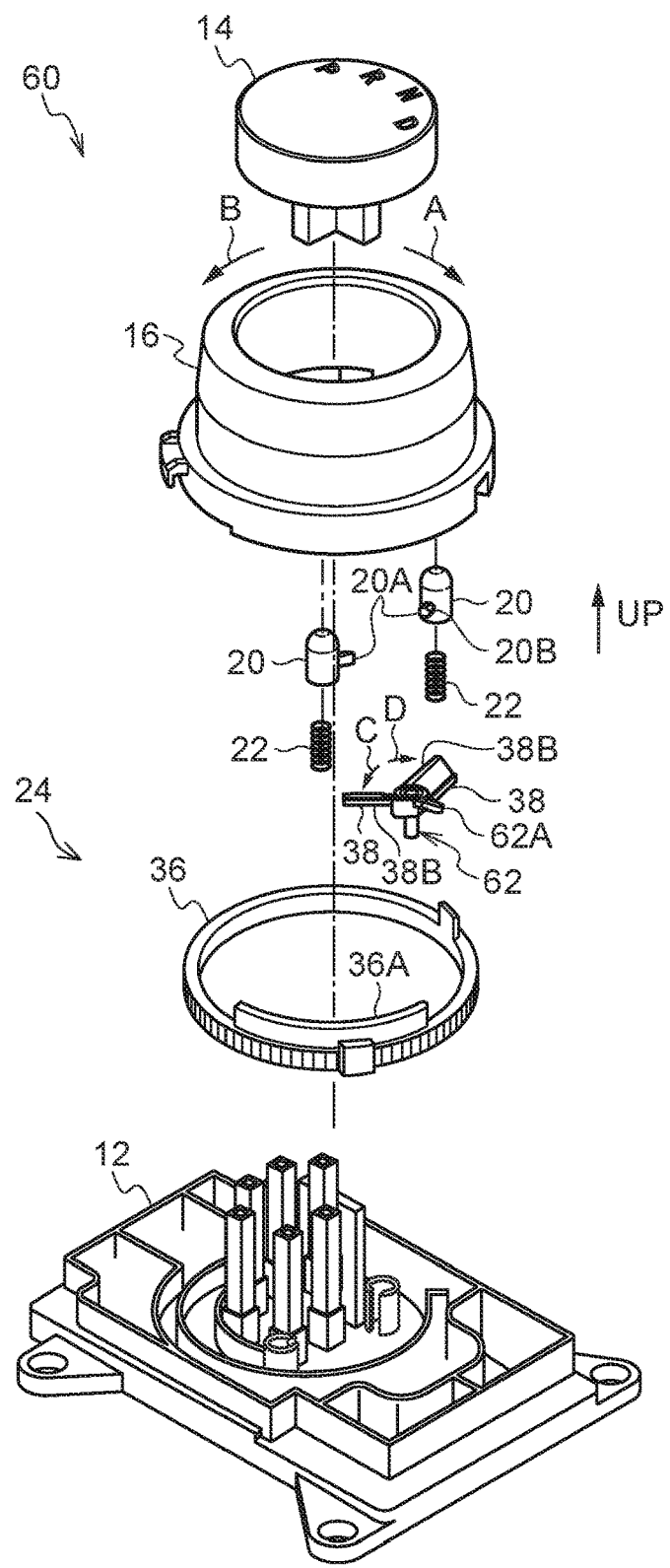
FIG. 11 is an exploded perspective view illustrating a shift device according to a third exemplary embodiment of the present disclosure, as viewed from above.
Figure 12:
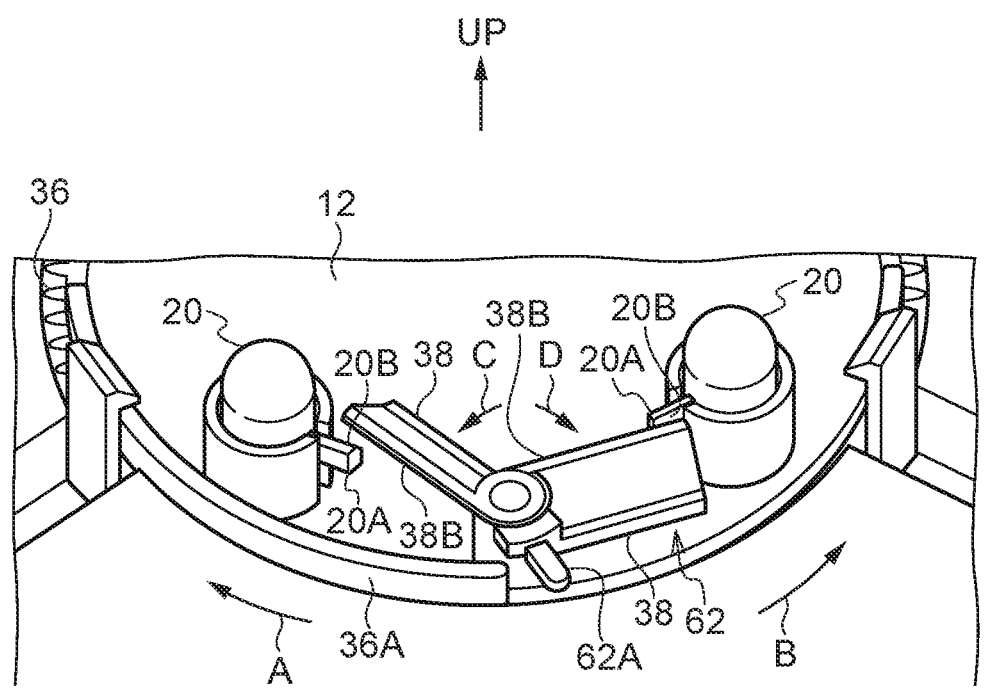
FIG. 12 is a perspective view illustrating relevant portions of a shift device according to the third exemplary embodiment of the present disclosure, as viewed from above.

FIG. 11 is an exploded perspective view illustrating a shift device 60 according to a third exemplary embodiment as viewed from above, and FIG. 12 is a perspective view illustrating relevant portions of the shift device 60 as viewed from above.

The shift device 60 according to the present exemplary embodiment has basically similar configuration to that of the first exemplary embodiment, except with regard to the following points.

As illustrated in FIG. 11 and FIG. 12, in the shift device 60 according to the present exemplary embodiment, a link 62, serving as a release body, is supported between the indexing pins 20 by the base 12 so as to be capable of rotating. The link 62 is disposed with its axial direction parallel to that of the rotor cam 36, and is capable of rotating in a release direction (the arrow C direction in FIG. 11, etc.) and a return direction (the arrow D direction in FIG. 11, etc.). A column shaped rotation protrusion 62A is integrally provided to the link 62. The rotation protrusion 62A projects out toward the radial direction outside of the rotor cam 36, and a leading end face of the rotation protrusion 62A is curved along the rotation direction of the link 62 in a convex shape. An other direction side end portion of the rotation plate 36A of the rotor cam 36 is curved along its thickness direction in a convex shape.

The link 62 is integrally provided with a pair of rectangular plate shaped release projections 38, and the pair of release projections 38 respectively project out toward the one direction side and the other direction side. Lower faces of the release projections 38 are configured by release inclined faces 38B. The release inclined faces 38B are inclined in a downward direction on progression toward the return direction side.

The movable projection 20A of the indexing pin 20 on the one direction side projects out toward the other direction side, and a leading end portion of the release projection 38 on the one direction side of the link 62 is disposed at the return direction side of this movable projection 20A. The movable projection 20A of the indexing pin 20 on the other direction side projects out toward the one direction side, and a leading end portion of the release projection 38 on the other direction side of the link 62 is disposed at the return direction side of this movable projection 20A. A movable inclined face 20B is formed at a portion on an upper side and a return direction side of each movable projection 20A, and each movable inclined face 20B is inclined in a downward direction on progression toward the return direction side.

In the autocorrect mechanism 24, when the rotor cam 36 is rotated in the other direction, the release projections 38 of the rotor cam 36 are rotated in the other direction.

Figure 13:
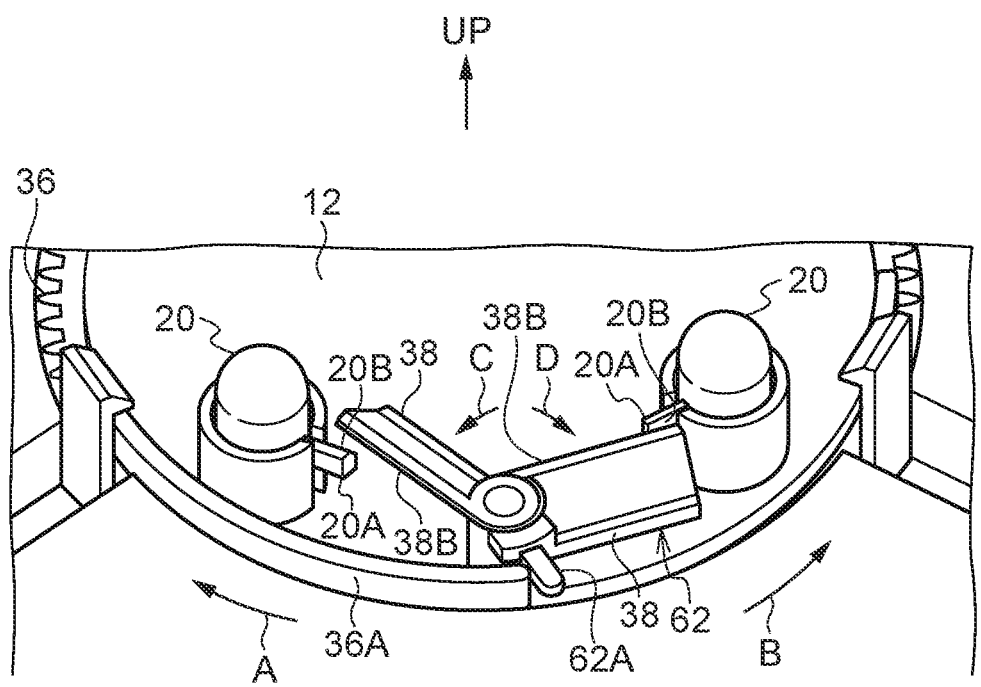
FIG. 13 is a perspective view illustrating a shift device according to the third exemplary embodiment of the present disclosure when a link begins to rotate, as viewed from above.

Thus, prior to the rotation plate 36A of the rotor cam 36 pressing the engagement projection of the knob 16 toward the other direction side, as illustrated in FIG. 13, the other direction side end portion of the rotation plate 36A abuts the rotation protrusion 62A of the link 62, and the link 62 is rotated in the release direction. The release inclined faces 38B of the release projections 38 of the link 62 abut the respective movable inclined faces 20B of the movable projections 20A of the indexing pins 20, and the release inclined faces 38B press the movable inclined faces 20B downward, such that the indexing pins 20 are moved downward against the biasing force from the springs 22. Due to a state being reached in which the rotation protrusion 62A is at the inner circumferential face of the rotation plate 36A, the indexing pins 20 are separated from, and rendered uncontactable with, the indexing faces 18 of the knob 16 (contact of the indexing faces 18 with the indexing pins 20 is released).

Figure 14:
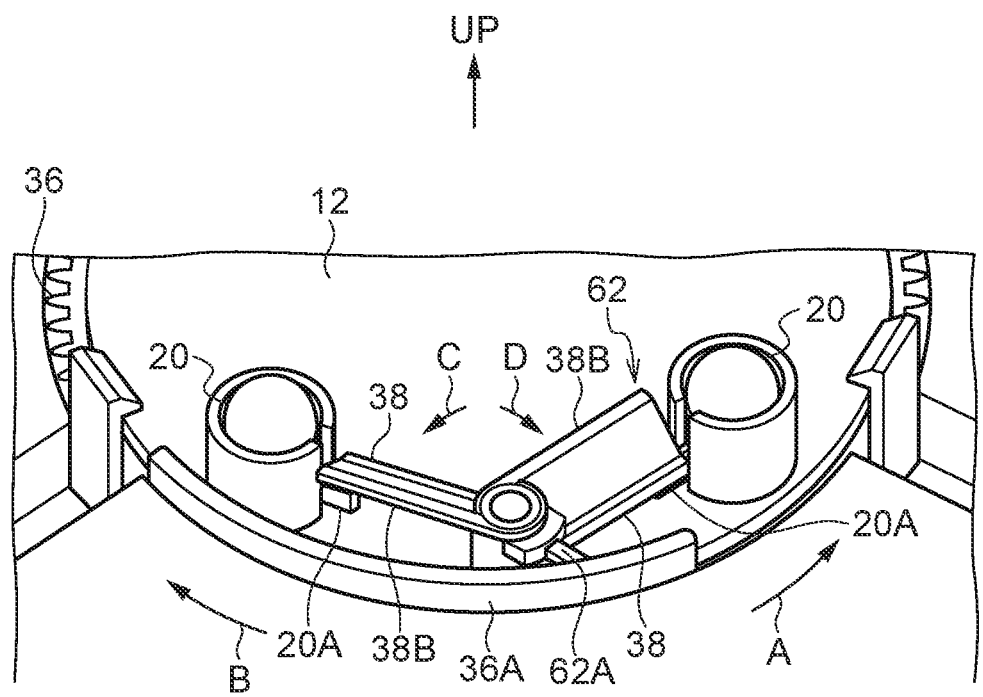
FIG. 14 is a perspective view illustrating a shift device according to the third exemplary embodiment of the present disclosure when indexing pins have been moved, as viewed from above.

Then, when the rotation plate 36A of the rotor cam 36 presses the engagement projection of the knob 16 toward the other direction side and the knob 16 is rotated from a position other than the P position to the P position, as illustrated in FIG. 14, due to the inner circumferential face of the rotation plate 36A moving the rotation protrusion 62A and locking rotation of the link 62 in the return direction, a state is maintained in which the movable projections 20A are pressed downward by the release projections 38, and a state is maintained in which the indexing pins 20 are separated from, and rendered uncontactable with, the indexing faces 18 of the knob 16.

When the rotor cam 36 is then rotated in the one direction, the rotation plate 36A is passed back over the rotation protrusion 62A. Thus, prior to the rotor cam 36 being rotated to the rotation restriction position, the link 62 is rotated in the return direction due to the biasing force from the springs 22, and the downward pressing of the movable projections 20A by the release projections 38 is released, such that the indexing pins 20 make contact with the indexing faces 18 of the knob 16.

Accordingly, the present exemplary embodiment also enables similar operation and advantageous effects to those of the first exemplary embodiment to be exhibited, except for the operation and advantageous effects from providing the release projections 38 to the rotor cam 36.

Moreover, the link 62 is provided separately from the rotor cam 36. The release projections 38 of the link 62 are therefore not integrally rotated with the rotor cam 36, thereby enabling interference between the release projections 38 and other components surrounding the rotor cam 36 to be suppressed.

Fourth Exemplary Embodiment

Figure 15:
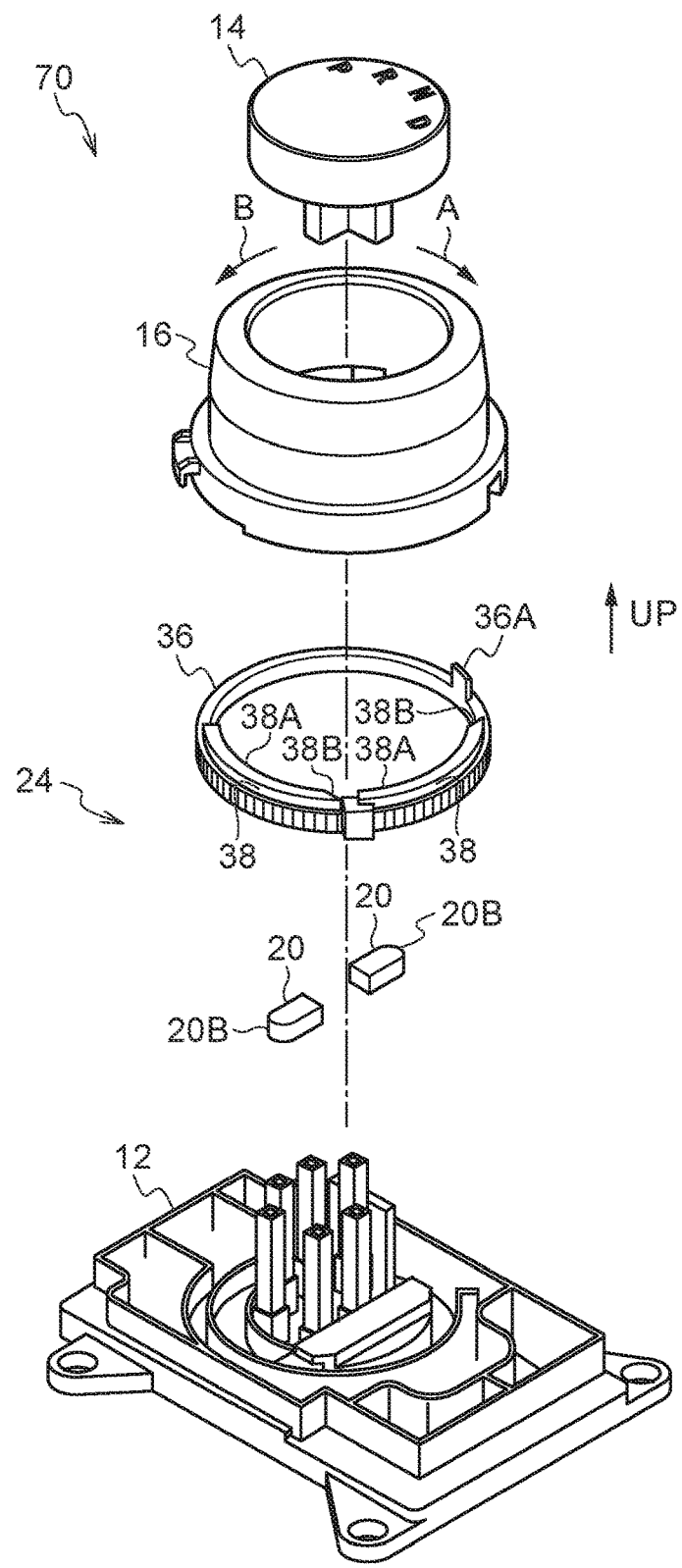
FIG. 15 is an exploded perspective view illustrating a shift device according to a fourth exemplary embodiment of the present disclosure, as viewed from above.
Figure 16:
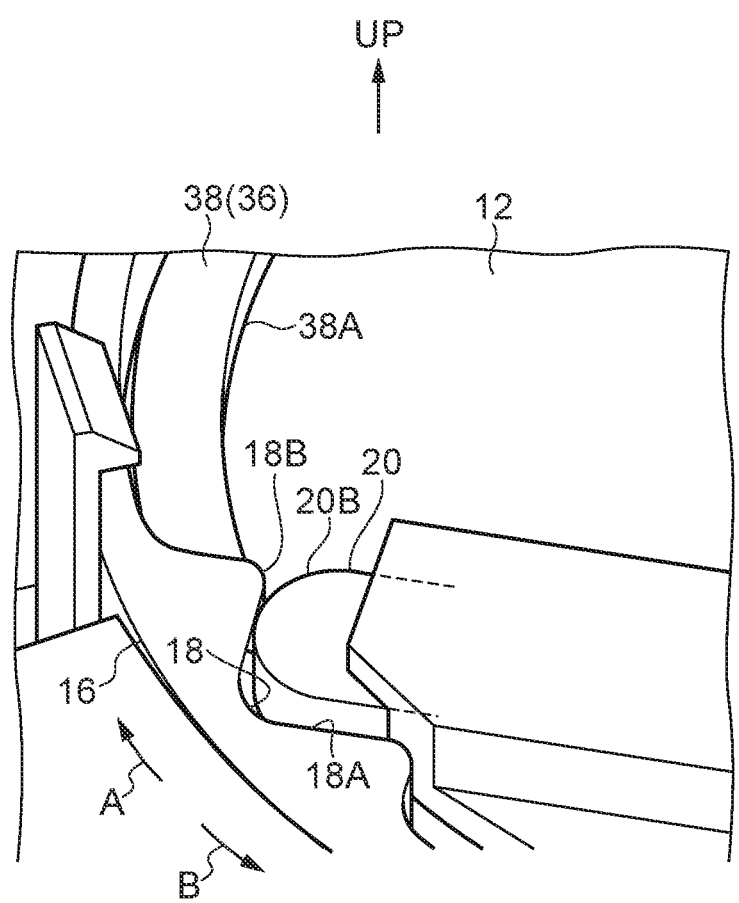
FIG. 16 is a perspective view illustrating relevant portions of a shift device according to the fourth exemplary embodiment of the present disclosure, as viewed from above.

FIG. 15 is an exploded perspective view illustrating a shift device 70 according to a fourth exemplary embodiment of the present disclosure, as viewed from above. FIG. 16 is a perspective view illustrating relevant portions of the shift device 70 as viewed from above, and FIG. 17 is a plan view illustrating relevant portions of the shift device 70 as viewed from above.

The shift device 70 according to the present exemplary embodiment has basically similar configuration to that of the first exemplary embodiment, except with regard to the following points.

Figure 17:
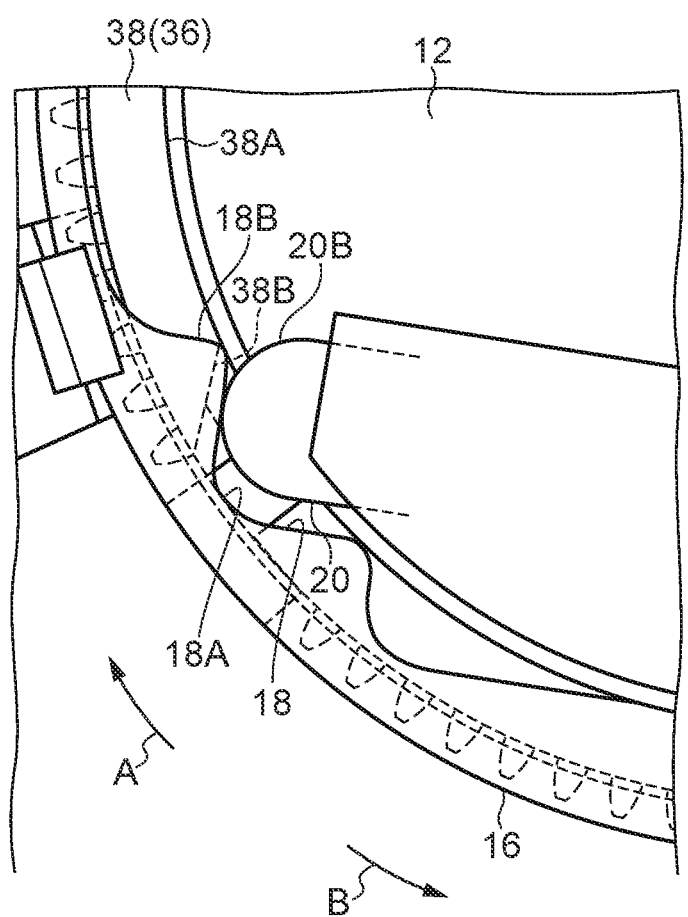
FIG. 17 is a plan view illustrating relevant portions of a shift device according to the fourth exemplary embodiment of the present disclosure, as viewed from above.

As illustrated in FIG. 15 to FIG. 17, in the shift device 70 according to the present exemplary embodiment, indexing faces 18 are formed to inner circumferential side portions at a lower end portion of the knob 16, with each indexing face 18 facing toward the radial direction inside of the knob 16.

Substantially cuboid shaped indexing pins 20 are supported by the base 12 at the knob 16 radial direction inside of the respective indexing faces 18, and the axial direction (length direction) of the indexing pins 20 is disposed perpendicular to the up-down direction. Movement of each indexing pin 20 in its width direction and its thickness direction is restricted, but each indexing pin 20 is capable of moving in its axial direction. A leading end face (a knob 16 radial direction outside face) of each indexing pin 20 is configured by a movable inclined face 20B that curves in its width direction in a convex shape. The movable projections 20A of the first exemplary embodiment are not provided to the indexing pins 20.

A spring 22 spans between the base 12 and the respective indexing pins 20. The spring 22 biases the indexing pins 20 toward their leading end sides, and causes the movable inclined face 20B of the respective indexing pin 20 to contact the respective indexing face 18 of the knob 16.

Release projections 38 are integrally provided to the rotor cam 36. Each release projection 38 projects out toward the radial direction inside of the rotor cam 36 and is separated from, and present at the one direction side of, the respective indexing pin 20. An inner peripheral face of each release projection 38 is configured by a release maintaining face 38A that extends along the circumferential direction of the rotor cam 36. An end face on the other direction side of each release projection 38 is configured by a release inclined face 38B that is inclined in a direction toward the radial direction inside of the rotor cam 36 on progression toward the one direction side.

In the autocorrect mechanism 24, the release projections 38 of the rotor cam 36 are rotated in the other direction when the rotor cam 36 is rotated in the other direction.

Figure 18:
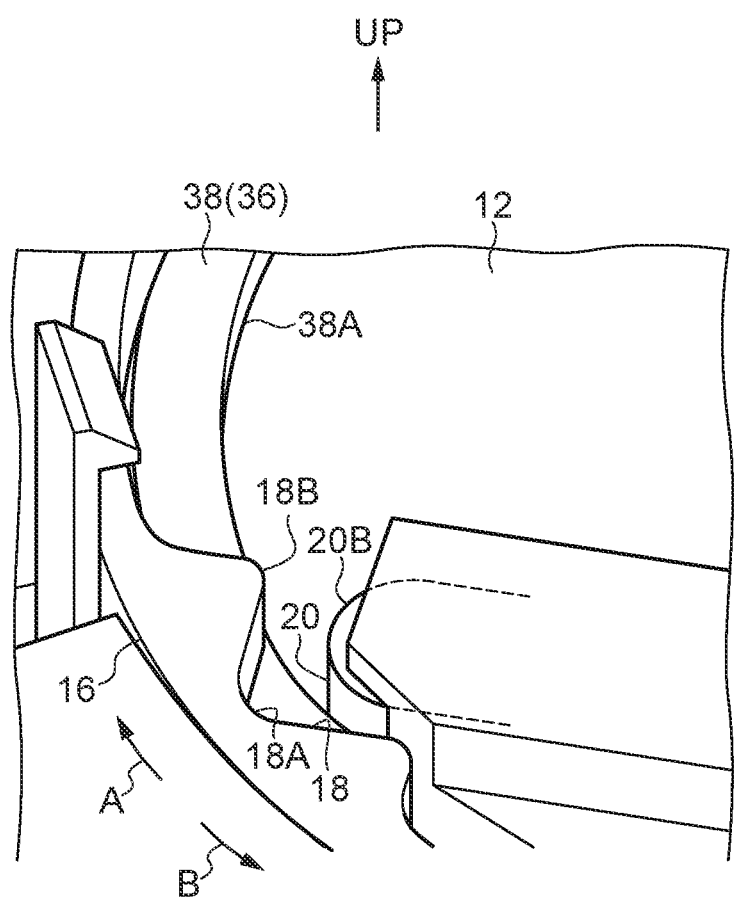
FIG. 18 is a perspective view illustrating a shift device according to the fourth exemplary embodiment of the present disclosure when an indexing pin has been moved, as viewed from above.
Figure 19:
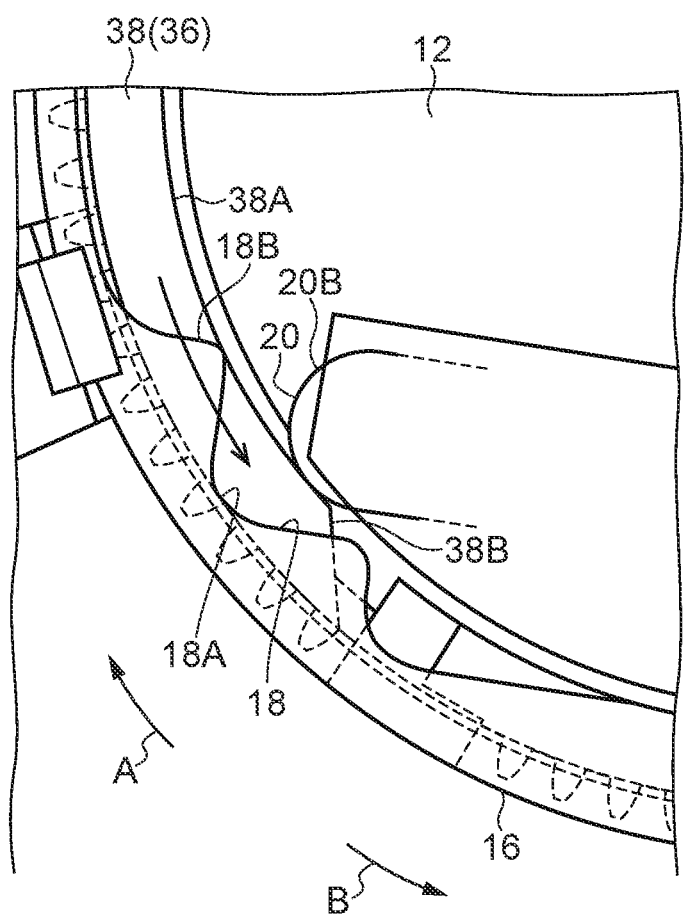
FIG. 19 is a plan view illustrating a shift device according to the fourth exemplary embodiment of the present disclosure when an indexing pin has been moved, as viewed from above.

Thus, prior to the rotation plate 36A of the rotor cam 36 pressing the engagement projection of the knob 16 toward the other direction side, the release inclined faces 38B of the release projections 38 abut the movable inclined faces 20B (leading end faces) of the respective indexing pins 20. The release inclined faces 38B press the movable inclined faces 20B toward the radial direction inside of the rotor cam 36 and the indexing pins 20 are moved toward the radial direction inside of the rotor cam 36 against the biasing force from the spring 22, such that, as illustrated in FIG. 18 and FIG. 19, a state is reached in which the movable inclined faces 20B is at the inner peripheral side of the release maintaining faces 38A of the respective release projections 38, and the indexing pins 20 are separated from, and rendered uncontactable with, the respective indexing faces 18 of the knob 16 (contact of the indexing faces 18 with the indexing pins 20 is released).

Then, when the rotation plate 36A of the rotor cam 36 presses the engagement projection of the knob 16 toward the other direction side and the knob 16 is rotated from a shift position other than the P position to the P position, due to the movable inclined faces 20B of the respective indexing pins 20 being moved by the release maintaining faces 38A of the release projections 38, a state is maintained in which the movable inclined faces 20B are pressed toward the radial direction inside of the rotor cam 36 by the respective release maintaining faces 38A, and a state is maintained in which the indexing pins 20 are separated from, and rendered uncontactable with, the respective indexing faces 18 of the knob 16.

When the rotor cam 36 is then rotated in the one direction, the release maintaining faces 38A and the release inclined faces 38B of the release projections 38 are passed back over the respective movable inclined faces 20B of the indexing pins 20. Thus, prior to the rotor cam 36 being rotated to the rotation restriction position, the pressing of the movable inclined faces 20B toward the rotor cam 36 radial direction inside by the release projections 38 is released, such that the indexing pins 20 make contact with the respective indexing faces 18 of the knob 16 due to biasing force from the spring 22.

The present exemplary embodiment accordingly enables similar operation and advantageous effects to be exhibited as those of the first exemplary embodiment.

The indexing pins 20 make contact with the respective indexing faces 18 of the knob 16 at the radial direction side of the knob 16. The shift device 70 can thus be made more compact in the axial direction of the knob 16.

Note that in the first exemplary embodiment to the fourth exemplary embodiment, when the engine start/stop switch is operated in a state in which the knob 16 has been disposed at a shift position other than the P position and the engine has been stopped, the shift position of the knob 16 may be changed to the P position after the shift range of the automatic transmission has been changed to the P range, or, the shift range of the automatic transmission may be changed to the P range after the shift position of the knob 16 has been changed to the P position.

In the first exemplary embodiment to the fourth exemplary embodiment, the autocorrect mechanism 24 changes the shift position of the knob 16 to the P position. However, the autocorrect mechanism 24 may change the shift position of the knob 16 to a shift position other than the P position (for example, the R position, the N position, or the D position).

In the first exemplary embodiment to the fourth exemplary embodiment, plural of the indexing faces 18 and the indexing pins 20 are respectively provided. However, in the first exemplary embodiment, the third exemplary embodiment, and the fourth exemplary embodiment, configuration may be such that only one indexing face 18 and only one indexing pin 20 are respectively provided.

In the first exemplary embodiment to the fourth exemplary embodiment, the indexing pins 20 are provided at the base 12 side, and the indexing faces 18 are provided at the knob 16 side. However, the indexing pins 20 may be provided at the knob 16 side, and the indexing faces 18 may be provided at the base 12 side.

In the first exemplary embodiment to the fourth exemplary embodiment, the springs 22 biases the respective indexing pins 20. However, the springs 22 may bias the indexing faces 18.

In the first exemplary embodiment to the fourth exemplary embodiment, the shift devices 10, 50, 60, 70 are shift-by-wire type shift devices. However, the shift devices 10, 50, 60, 70 may be shift devices other than a shift-by-wire type (for example, a mechanical cable type).

In the first exemplary embodiment to the fourth exemplary embodiment, the shift devices 10, 50, 60, 70 are installed to the instrument panel. However, the shift devices 10, 50, 60, 70 may be installed to a floor portion of the vehicle cabin, or to a steering column cover.

What is claimed is:

1. A shift device comprising:
    a shift body that is rotatable to change a shift position;
    an installation body, relative to which the shift body rotates;
    a contact portion that is attached to one of the shift body or the installation body;
    a contact member that is attached to the other of the shift body or the installation body, and that makes contact with the contact portion such that a force acts to rotate the shift body from between shift positions toward a shift position side;
    a rotation member having a rotation portion that causes the shift body to rotate such that a shift position of the shift body is changed;
    a release mechanism that releases contact of the contact member with the contact portion when the rotation portion causes the shift body to rotate, the release mechanism having a release portion that is moved when the rotation member rotates the shift body, and that releases contact of the contact member with the contact portion; and
    an inclined face on at least one of an abutting portion of the release portion that abuts the contact member, and an abutting portion of the contact member that abuts the release portion, and that is inclined in a direction toward the contact portion side on progression along a direction of movement of the release portion.

2. The shift device of claim 1, wherein the rotation member includes the release portion.

3. The shift device of claim 1, wherein the contact member comprises a plurality of contact members configured so as to be capable of moving integrally with each other.

* * * * *